United States Patent

[11] 3,550,654

[72] Inventor Elbridge W. Thrasher
    Ukiah, Calif.
[21] Appl. No. 769,885
[22] Filed Oct. 23, 1968
[45] Patented Dec. 29, 1970
[73] Assignee Masonite Corporation
    a corporation of Delaware

[54] SAW GUIDE MOUNTING
    3 Claims, 4 Drawing Figs.
[52] U.S. Cl. ..................................... 143/56,
    143/165
[51] Int. Cl. ..................................... B27b 25/02,
    B27b 11/02
[50] Field of Search ........................... 143/37,
    37.1, 37.2, 56, 160, 165; 287/(Inquired)

[56] References Cited
UNITED STATES PATENTS
1,985,500  12/1934  Horstkotte ................ 143/37

Primary Examiner—Andrew R. Juhasz
Assistant Examiner—Leon Gilden
Attorney—Eckhoff and Hoppe ABSTRACT: In a saw machine having an arbor, at least one circular saw mounted thereon and saw guides for maintaining the saw in a predetermined cutting plane, an improved saw guide support comprising a support member having a pivot axis extending substantially parallel to the saw arbor, a replaceable saw guide including a support arm having one end loosely pivoted upon said support member, and a stop member positioned for engaging and positioning said saw guide in pivotal but guiding relation to the saw, the pivotal fit between the one end and support member allowing said saw guide to be rocked upon the support member to move the saw guide laterally and displace the saw guide from engagement with said stop member.

PATENTED DEC 29 1970

ELBRIDGE W. THRASHER
INVENTOR.

BY
Eckhoff and Hoppe
ATTORNEYS

SAW GUIDE MOUNTING

This invention relates to apparatus for guiding saws and maintaining one or a plurality of saws in predetermined cutting planes. The invention has particular relation to my earlier invention of U.S. Pat. No. 3,285,302 in which saw guides including replaceable wear guides are used for controlling the cutting action of unusually thin saws. Apparatus of that type, it has been found, may be used to obtain a larger recovery of usable lumber than is otherwise possible with more conventional apparatus.

The present invention is primarily concerned with the problem of providing a saw guide mounting that may be used in conventional saw machinery having a roller disposed in near proximate relation to the leading edge of the saws. The location of such a roller makes it difficult to mount a saw guide as to provide points of contact near the gullet line on the leading edge of the saw. Further, the need for periodic replacement of the saw guides and the resharpening of saws requires a saw guide mounting that does not hamper such functions.

In brief, this invention involves the use of saw guides having one end pivotally supported upon a support member disposed below the feed roller of a standard saw machine. Each saw guide is maintained in guiding relation to at least one saw of the machine by a stop bar but a loose fit formed between the one end of each saw guide and the support member allows each saw guide to be rocked laterally as to displace the saw guide from engagement with the stop member. Thereafter, the guide may be pivoted upon the support member to a position that will allow the saws to be moved freely along their supporting arbor.

One object of this invention, therefore, is to provide an improved saw guide mounting that may be used with conventional saw machines having a feed roller disposed in near proximity to the lead edge of the saw blades.

Another object is to provide a saw guide mounting of the kind described that allows each saw guide to be independently removed or replaced with a minimum of effort and time.

Other objects of this invention will become apparent in view of the following detailed description and the accompanying drawings.

In the drawings forming a part of this application and in which like parts are identified by like reference numerals throughout the same, FIG. 1 is a vertical section taken through a battery edger having a plurality of saw guides mounted in a preferred manner contemplated by this invention;

Figure 1:
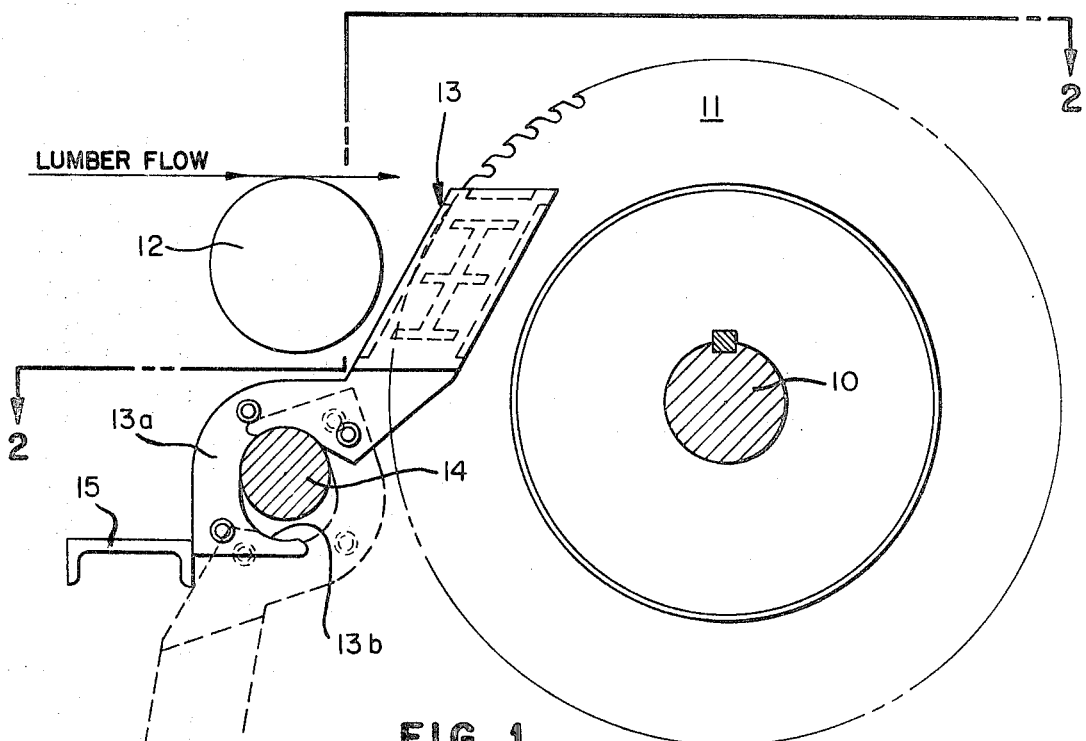
Figure 2:
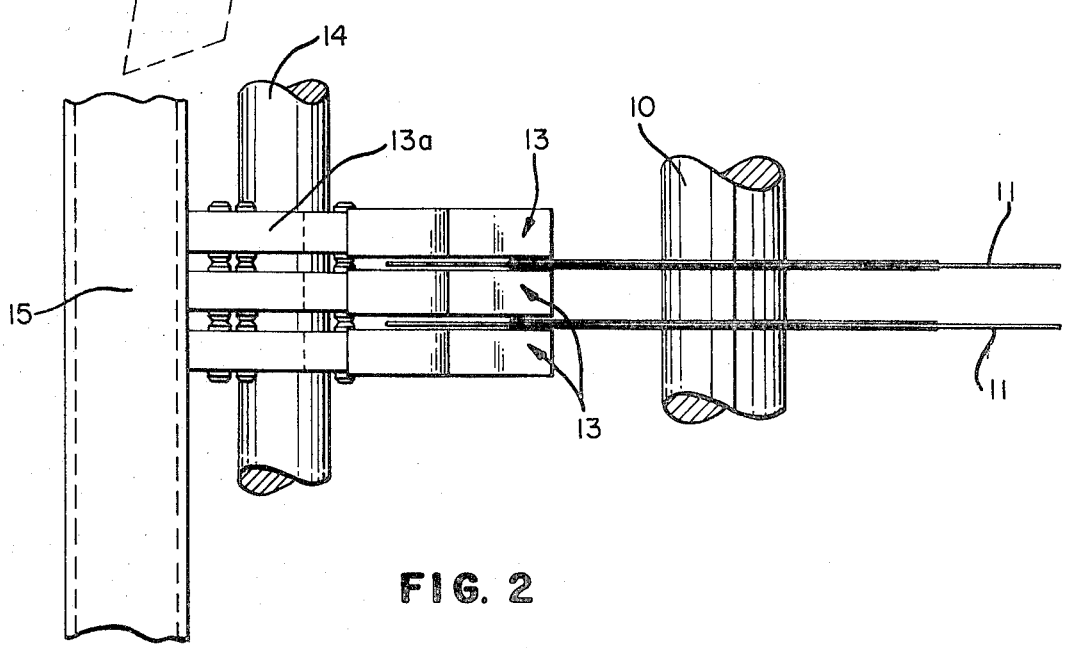
FIG. 2 is a detail and section in plan view taken on lines 2–2 of FIG. 1.

Referring to FIG. 1 in particular, there is shown schematically a portion of a battery edger comprised of an arbor 10 that supports a plurality of circular saws 11. Each saw 11 is keyed to the arbor 10 with a floating axial looseness, as described in Pat. No. 3,285,302. A roller 12, which forms part of a conventional edger machine, is employed for moving cants or flitches into the battery of saws 11. The cut pieces are then carried through and past the saws by a second roller not shown.

This invention is more particularly directed to the construction of saw guides 13 which maintain the saw blades 11 in essentially parallel and spaced relation upon the arbor 10. Saw guides of this general type are now becoming widely used in connection with the practice of the invention described in U. S. Pat. No. 3,285,302. However, because of the location of roller 12, which is disposed in near proximate relation to the leading edge of saw blades 11, it is difficult to support the saw guides in positions of interdigitation with the saw blades and yet permit removal of the saws and/or saw guides when they become worn. The problem is further complicated by the great weight of each saw guide which makes it difficult if not impossible to remove more than one saw guide at a time.

Figure 3:
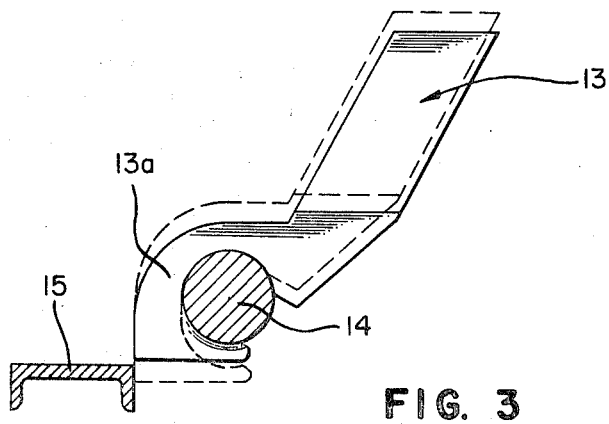
FIG. 3 is a side elevation illustrating one position of each saw guide as it is being removed from its support member.
Figure 4:
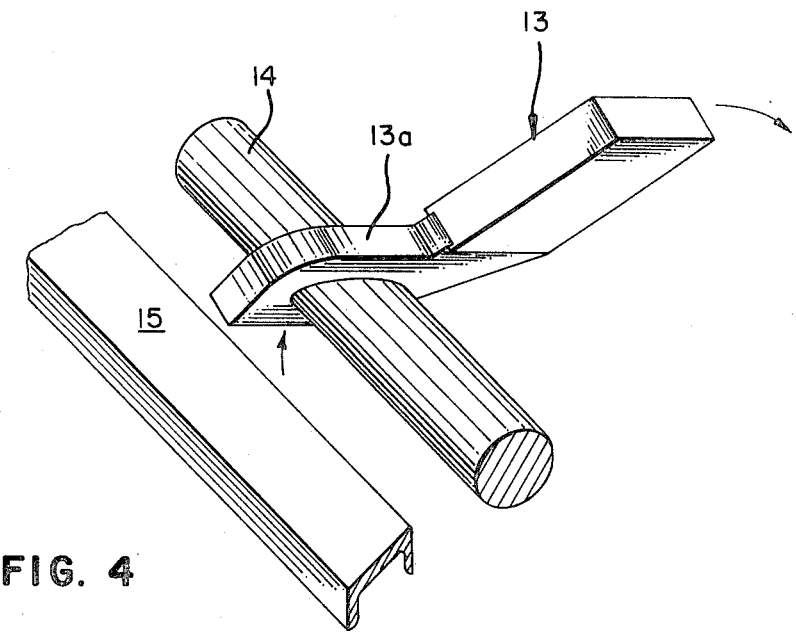
FIG. 4 is a perspective view of the saw guide illustrated in FIG. 3.

More particularly, this invention comprises a saw guide 13 having a hooked end 13a adapted to be mounted upon a support member 14 and held in guiding relation relative to saw blade 11 by a stop member 15. Hooked end 13a is formed with an elongated opening that is partly defined by concave surface 13b. An open side of greater width than support member 14 allows the saw guide to be removed from the support member after the guide is placed in the broken line position shown in FIG. 1. This is accomplished in the manner indicated by FIGS. 3 and 4 which illustrate how the saw guide may be rocked laterally away from the saw blade until hooked end 13a clears stop member 15. Thereafter, the guide may be pivoted clockwise, as illustrated, into the broken line position of FIG. 1.

It will be evident that the saw guide mounting illustrated and described provides a simple yet effective means for installing and replacing saw guides or for positioning the saw guides to allow axial removal of saws 11 from arbor 10. Importantly, the saw guide mounting may be used in connection with edger machines having a feed roller disposed in near proximate relation to the leading edge of the saw blades.

Although a preferred embodiment of the invention has been illustrated and described, various modifications and changes may be resorted to without departing from the spirit of the invention or the scope of the attached claims.

I claim:

1. In a saw machine having an arbor, at least one circular saw mounted thereon and saw guides for maintaining the saws in a predetermined cutting plane, an improved saw guide support comprising: a support member having a pivot axis extending substantially parallel to the saw arbor, a replaceable saw guide including a support arm having one end loosely pivoted upon said support member with a pivotal fit; and a stop member positioned for engaging and positioning said saw guide in pivotal but guiding relation to the saw, the pivotal fit between the one end and support member allowing said saw guide to be rocked transversely of the predetermined cutting plane upon the support member and displaced vertically from engagement with said stop member.

2. The apparatus of claim 1, and further comprising a roller for feeding material into said saw, said roller being positioned in near proximity to the leading edge of said saw and in front of the guiding portion of said saw guide, said support member being located vertically displaced relative to said roller, said pivotal fit allowing said saw guide to be pivoted in a direction away from said roller and in a plane essentially parallel to the guided saw.

3. The apparatus of claim 1, the one end of said support arm having an open side oriented to allow said support arm to be disengaged from said support member when said saw guide occupies a position pivotally displaced from between guided saws.